United States Patent [19]
Kobota et al.

[11] 3,820,883
[45] June 28, 1974

[54] MOTION PICTURE CAMERA

[75] Inventors: Isamu Kubota, Izumisano; Yukio Miki, Sakai, both of Japan

[73] Assignee: Minolta Camera Kabushiki Kaisha, Osaka-shi, Osaka-fu, Japan

[22] Filed: Aug. 9, 1972

[21] Appl. No.: 279,040

Related U.S. Application Data
[62] Division of Ser. No. 181,333, Sept. 17, 1971.

[52] U.S. Cl. .............................. 352/91 S, 352/162
[51] Int. Cl. ......................................... G03b 21/36
[58] Field of Search ............................. 352/91, 162

[56] References Cited
UNITED STATES PATENTS 3,471,227  10/1969  McClellan et al. ................ 352/162
3,545,852  12/1970  Winkler et al. ...................... 352/91
3,644,025  2/1972  Katsuyama ........................... 352/91

*Primary Examiner*—Samuel S. Matthews
*Assistant Examiner*—Russell E. Adams, Jr.
*Attorney, Agent, or Firm*—Watson, Cole, Grindle & Watson

[57] ABSTRACT

A film moving control device for a motion picture camera so designed that by shifting a cam up to 180° for operating a feed claw in phase relative thereto, the normal photographing and the reverse photographing can be carried out by a driving mechanism operated in only one direction. Moreover, the normal photographing and the overlap photographing accompanied by reverse transfer can be carried out by the driving mechanism driven in one direction.

5 Claims, 14 Drawing Figures

PATENTED JUN 28 1974

MOTION PICTURE CAMERA

This is a division, of application Ser. No. 181,333, filed Sept. 17, 1971.

BACKGROUND OF THE INVENTION

The present invention relates generally to a film moving control device for a motion picture camera in which a film can be wound and rewound by a driving mechanism operated in one direction, and more particularly to a novel device capable of effecting an overlap-photographing by a motion picture camera by making use of such a film moving control device.

In general, a film moving device in a motion picture camera is driven to synchronize a feed claw with a shutter blade, the claw engaging with film perforations. The film is stopped during the exposure time and is fed as far as a frame during closing of the shutter. In such prior art a device, in order to enable the film to be reversely delivered, a change-over switch is provided for reversing a driving motor for the motion picture camera, or a change-over clutch or like means is provided in a transfer mechanism from the motor to a feed claw for changing over the normal and reverse turning. However, additional mechanisms are required for such devices which only complicate the mechanism of the motion picture camera.

Also, an overlap photographing device provided with a reversing mechanism has been well known in motion picture cameras. However, the reversing mechanism is not only complex but, in relationship to the shutter opening and closing mechanism, the whole arrangement is quite complex. That is to say, in order to perform the overlap photographing the fade-out photographing on a film within a predetermined length and the film rewinding within the same length are required to be continuously carried out and in addition rewinded onto the film to carry out the fade-in photographing and the normal photography sequentially. Therefore, a special member is required for changing over the camera to the normal driving and the reverse driving and, similar to the prior art devices mentioned hereinbefore, a reversible motor or a reversible clutch must be used. In addition, a counter member is required for counting the film length for the fade-out photography, the film rewinding, and the fade-in photographing, and a fade-in and fade-out operation member are required, which are in need of a change-over member for performing the normal and reverse turning and stopping operation, in separating from the normal and reverse driving of the camera. Consequently the formation entire arrangement becomes quite complex.

OBJECTS OF THE INVENTION

One object of the present invention is to provide a film moving control device which maintains the driving mechanism of a motion picture camera in a condition operated in one direction and effects the reverse delivery of the film by means of a very simple and novel means.

Another object of the present invention is to provide a film moving control device in which a normally operated motor is used and a feed claw is adapted to feed in a normal and reverse direction instead of reversing a member for meshing with the motor.

A further object of the present invention is to provide a trick photographic device for a motor picture camera, in which the normal photographing and the overlap photographing customarily carried out in the prior art by means of a complex mechanism can be performed by a very simple and novel means.

A still further object of the present invention is to provide an overlap photographic device for a motion picture camera, in which the formation of its mechanism is simplified, misoperation and malfunction are avoided, and any shock to the camera due to changing over a driving mechanism between normal and reverse is eliminated.

A still further object of the present invention is to provide a fade-in and fade-out control device in which, by making use of a motor rotated only in one direction, the opening and closing of the shutter and the normal and reverse feed of a film can be controlled, and the fade-in and fade-out operation can be controlled by changing over a single operation member.

A still further object of the present invention is to provide a motion picture camera provided with a counter device which is rendered inoperative during the fade-out photographing and the film rewinding in photographing including the overlap photographing and counts only the actual film length actually fed when trick photographing is actuated.

SUMMARY OF THE INVENTION

In a film moving control device for a motion picture camera, a cam located on a cam shaft is provided for moving a feed claw back and forth relative to the film so as to change over the phase relative to the feed claw up to 180°. Accordingly, two cam surfaces are provided the phases of which are shifted up to 180° along the inner circumference as the cam formed to the cam shaft direction and, by connecting any one of said two cam surfaces with a claw operation plate, the normal and reverse operation of the film delivery is controlled. Otherwise, as the control device for the normal and reverse of the film delivery, there are provided two contact pieces between the claw operation plate and the cam surface, the phases of the two pieces being shifted up to 180°, and by letting said contact pieces cooperate selectively with the cam surface, said control can be effected.

In such a film moving device, the feed claw brings about an action combined with reciprocating motions in two directions parallel to the film running direction, and at a direction at right angles to the film surface. That is, in the advanced position, the feed claw engages with a perforation of the film and in the retreated position, the feed claw is out of engagement with the perforation. As a result, the feed claw descends in the advanced position and ascends in the retreated position, or in opposition in the retreated position, the feed claw descends and in the advanced position, the feed claw ascends, whereby the film is fed downwardly or upwardly. In other words, even though the feed claw driving mechanism is not reversed, by changing the relation of the mutual phases of the reciprocating motion of the feed claw in the film running direction, and the reciprocating motion in the direction at right angles to the film surface, the film feeding direction can be changed. The present invention aims to take advantage of this. In addition, the presently designed film moving control device and the fade-in and fade-out control device are formed into a special interlock arrangement so that the normal photographing and the overlap photographing comprised of the fade-out photographing, the film rewinding, and the fade-in photographing, can be changed over.

In the film moving control device in accordance with the present invention, the frame feeding direction is changed over through rotation of the driving shaft in one direction by means of a reliable and simple mechanism. Therefore, there is no need of a reversing clutch or a change-over switch to effect the normal and reverse rotation of the motor. Accordingly not only is the mechanism quite simple but the production cost is also low, thereby providing a suitable device in a motion picture camera having such a complex mechanism as in the overlap photograph.

Also in the overlap photographic device in accordance with the present invention, the film moving control device and a cam member for controlling the fade-in and fade-out are arranged to turn in the same direction during the control. Therefore, there is no need of a means for reversing the camera driving mechanism, thereby remarkably simplifying the mechanism for the overlap photographing and eliminating any shock due to reversing during film rewinding. Accordingly, the durability of the camera is increased any malfunction and misoperation are eliminated.

BRIEF DESCRIPTION OF THE DRAWINGS

FIG. 11 (a) is a front view of the claw operation cam in the FIG. 8 embodiment and FIG. 11 (b) is a sectional side view taken along line 11b—11b of FIG. 11a.

DESCRIPTION OF THE PREFERRED EMBODIMENT

Figure 1:
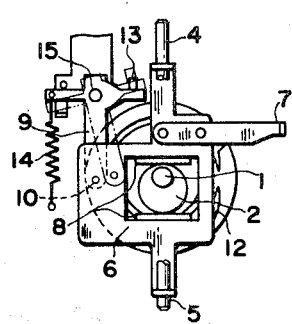
FIG. 1 is a front view of a first embodiment of a film moving control device for a motion picture camera in accordance with the present invention.
Figure 2:
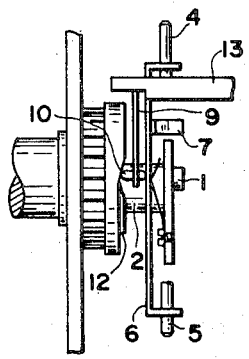
FIG. 2 is a side view of the first embodiment shown in FIG. 1.
Figure 4:
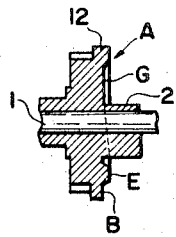
FIG. 4 is a sectional view of the claw operation cam taken along line 4—4 of FIG. 3.

FIGS. 1 to 7 show two embodiments of a film intermittent feed device enabling a film to be moved in a normal and reverse direction.

In these figures, reference numeral 1 designated a main shaft for interlocking with a shutter blade. A shutter blade (not shown) and two cams 2, 12 for moving a film are each fixed to shaft 1. Cam 2 is an eccentric cam fitted in an opening 8 of a claw operation plate 6 having a feed claw 7 thereon. Cam 2 reciprocates feed claw 7 up and down keeping pace with rotation of main shaft 1. This motion is in a direction parallel to the running direction of film $F_o$ (in FIG. 5). Cam 12 extends in the direction of shaft 1 for reciprocating feed claw 7 back and forth to engage and disengage film $F_o$. Claw operation plate 6 is guided for vertical movement on and rotation about guide pins 4 and 5. A control piece 10 is located between claw operation plate 6 and the cam surface of cam 12. Plate 6 is turned about pins 4 and 5 by means of piece 10 in accordance with the unevenness of the cam surface. This relationship is clearly shown in FIG. 2 and in FIG. 7. In this figures, a plate spring (unreferenced) biasses plate 6 for turning movement so that plate 6 may be correctly turned by the surface of cam 12 to move to a position at which feed claw 7 engages and disengages a perforation of film $F_o$.

In the embodiment shown in FIGS. 1 to 4, two cam surfaces are formed along the inner and outer circumferences of cam 12. The cam surface formed along the outer circumference of cam 12 consists of A,B,C, and D, and the cam surface along the inner circumference consists of E, F, G, and H. A is a high portion, B is a low portion, and C and D are an inclined portions for connecting the high and low portions. Contact piece 10 is fixed to lever 9 which comprises a plate spring. In FIG. 1, by moving the position of contact piece 10, which is located on opposite sides of lever 9 at the lower end thereof, contact piece 10 can come into contact with the cam along the outer circumference at the inner circumference of cam 12. For this changing over operation, by moving operation member 13 up and down, member 13 being provided on the upper end of lever 9, lever 9 is turned about shaft 15 against spring 14, and the position of contact piece 10 is changed over relative to cam 12. In FIG. 1, the full line shows the position at which operation member 13 has descended and contact piece 10 is contact with the cam surface along the outer circumference of cam 12. Upon stopping to push down operation member 13, lever 9 takes the position shown by the dotted line through the function of spring 14, and contact piece 10 comes into contact with the cam along the inner circumference of cam 12.

Figure 3:
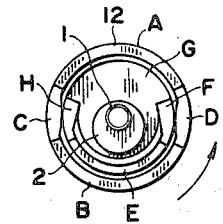
FIG. 3 is a front view of a claw operation cam used in the first embodiment shown in FIG. 1.
Figure 5:
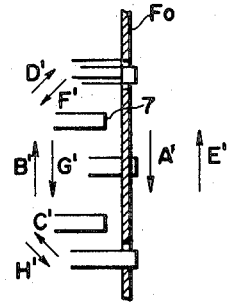
FIG. 5 is an illustration showing the operation of a film and a feed claw in accordance with the present invention.

When contact piece 10 comes into contact with the cam surface along the outer circumference of cam 12 and, in FIG. 3, main shaft 1 is turned to the direction shown by the arrow, feed claw 7 is at the end of its descending stroke, contact piece 10 is in the position C, and feed claw 7 is out of engagement with a perforation of film $F_o$ (C' in FIG. 5). Due to the rotation of main shaft 1 in the direction shown by the arrow, feed claw 7 comes out of engagement with a perforation and simultaneously starts to ascend, after which feed claw 7 ascends just as it is out of such engagement through the high portion A of the cam (operation of B' shown by the arrow in FIG. 5). When main shaft 1 is rotated 180°, feed claw 7 comes to the end of its ascending stroke, the inclined portion D comes to the position of contact piece 10, and feed claw 7 is about to come into contact with the next perforation in the middle of the forward stroke (operation of D' shown by the arrow in FIG. 5). When main shaft 1 further continues to rotate feed claw 7 is in the forward position through the outer low surface portion cam B of cam 12 and descends to feed film $F_o$ by one frame and return to the condition shown in FIG. 3 (operation of A' in FIG. 5).

Next, when contact piece 10 comes into contact with the surface along the inner circumference of cam 12, contact piece 10 is in the inclined portion H and on the end of descending stroke of feed claw 7, and feed claw 7 is in the middle of the backward stroke (in the middle of operation of H' shown by the arrow in FIG. 5). Due to the subsequent rotation of main shaft 1, feed claw 7 ascends just as it is in engaging with a perforation of the film through the low portion G of the cam surface (operation of E' shown by the arrow in FIG. 5) and returns the film upward by one frame. In the subsequent rotation, feed claw 7 is operated through the inclined portion F and the high portion E of the cam surface, as shown by arrows F' and G' in FIG. 5.

In this manner, by changing over contact piece 10 to come into contact with two surfaces in different phase along the inner and outer circumferences of cam 12, it is possible to change the feeding direction of the film.

Figure 6:
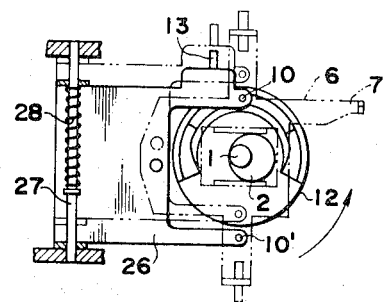
FIG. 6 is a front view of a second embodiment of a film moving control device for a motion picture camera in accordance with the present invention.
Figure 7:
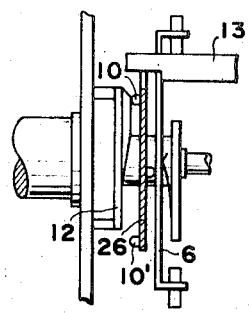
FIG. 7 is a side view of the second embodiment shown in FIG. 6.

In the second embodiment shown in FIGS. 6 and 7, only one cam surface is provided on cam 12 along its circumference. However, two contact pieces 10 and 10' capable of coming into contact with the cam surface of cam 12 are provided at opposite sides of shaft 1 on the upper and lower portions of a holding plate 26 which is mounted for vertical sliding movement on a shaft 27. Upon pushing down operation member 13 of holding plate 26 against spring 28, upper contact piece 10 takes the position shown by the full line in FIG. 6 to come into contact with the cam surface of cam 12. Upon stopping the press operation member 13 of holding plate 13, holding plate 26 is changed over so that lower contact piece 10' may take the position shown by the dotted line in FIG. 6 to come into contact with the cam surface of cam 12.

Cam 12 consists of cam surfaces A,B,C, and D, wherein A is a high portion, B is a low portion, and C and D are an inclined portions connecting the high and low portions, as is shown on the outer circumference of cam 12 in FIG. 3. Provided that upper contact piece 10 comes into contact with the cam surface, when main shaft 1 is rotated to the direction shown by the arrow, the film is intermittently moved downwardly. And when lower contact piece 10' comes into contact with the cam surface, the film is intermittently moved upwardly. In this manner, by changing over upper contact piece 10 and lower contact piece 10' with each other, the phase relationship of back and forth strokes to the ascending and descending strokes of feed claw 7 is just reversed. Therefore, the same operation as illustrated in FIG. 3 and in FIG. 5 is carried out and the rewinding of the film can be effected.

According to the two embodiments mentioned above, by improving the formation of the cam surface for operating the feed claw, or the formation of the contact piece between the cam surface and the claw operation plate, the frame feeding direction can be changed by rotation of the main shaft in the same direction.

The device shown in FIGS. 8 to 13 makes use of the first and second embodiments shown in FIGS. 1 to 7 as a film normal and reverse moving control device. Accordingly, the overlap photographing is effected only by the rotation of the main shaft in the same direction. Reference numeral 31 designates an operation plate which is slidable vertically as its guide slot 31a engages with pin 32 located on the camera body. An operation pin 31b is provided at the lower portion of plate 31 and an index 31c is provided on the right portion thereof. Index 31c is arranged to face index 34 formed on the camera body and constituting mark "N" for indicating the ordinary photographing and mark "T" for indicating the overlap photographing.

Operation lever 33, which is engageable with operation pin 31b of operation plate 31, is pivotally mounted on shaft 33a and is biassed clockwise by means of a spring 35. And, operation lever 33 is provided at its front end with an engage projection 33b which slidingly engages with the surface of cam 38 of control cam member 36, to be described in more detail hereinafter. Lever 33 is provided at its other end with an operation edge 33c.

Figure 13:
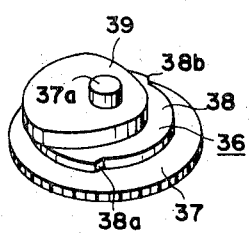
FIG. 13 is a perspective view of the control cam member in the FIG. 8 embodiment.

As shown clearly in FIG. 13, control cam member 36 includes fixing gear 37, cam 38 on gear 37, and a fade-in and fade-out operation cam 39 together mounted on shaft 37a of gear 37. Shaft 37a of control cam member 36 is restrained by means of a spring 40 arranged to turn control cam member 36 counter-clockwise. The turning of control cam member 36 is stopped when pin 37b (shown in FIg. 8) provided on gear 37 comes in contact with a stopper 41.

Figure 12:
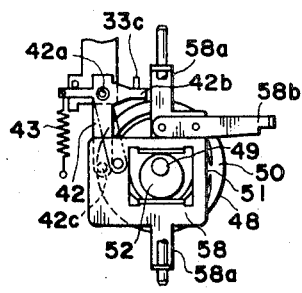
FIG. 12 is a front view of the feed claw, the claw operation cam, and the normal and reverse change-over lever in the FIG. 8 embodiment.

A change-over lever 42 is provided with a driven arm 42b for engagement with an operation edge 33c of operation lever 33 as shown in FIG. 12, is pivoted on a shaft 42a and is given the counter-clockwise turning tendency by means of a spring 43. A contact piece 42c adapted to contact surface of the a cam 48 is provided at the tip of one arm of lever 42. The operation of change-over lever 42 is the same as that of change-over lever 9 in FIG. 1 provided with contact piece 10.

Figure 8:
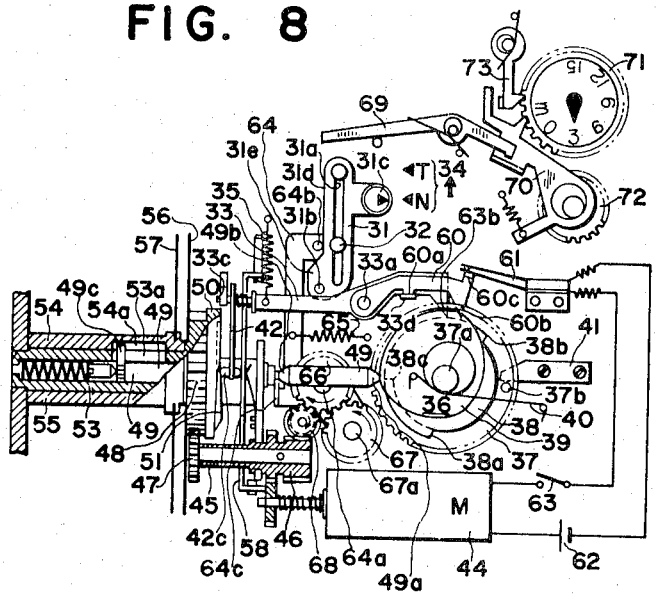
FIG. 8 is a side view showing the essential formation in the normal photographing condition of an embodiment of an overlap photographic device in accordance with the present invention.
Figure 9:
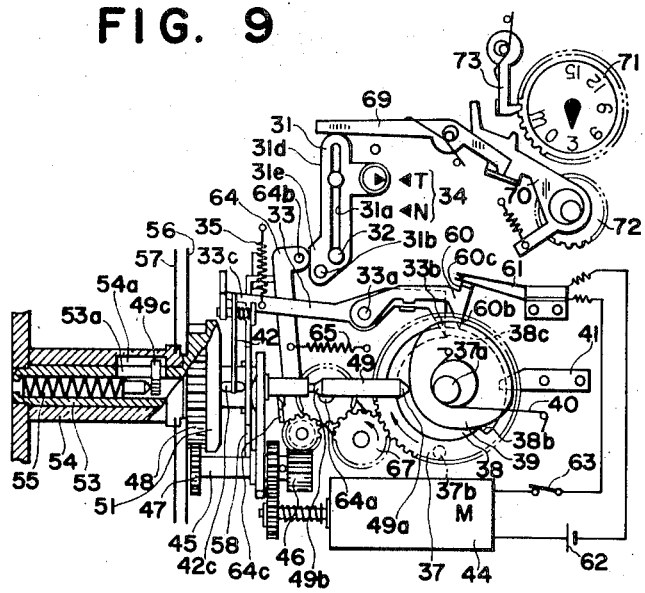
FIG. 9 is a side view showing the condition of the FIG. 8 embodiment at the time when changed over to the overlap photographing and the fade-out photographing thereof is completed.
Figure 11A:
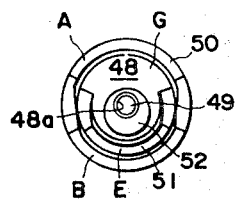
Figure 11B:
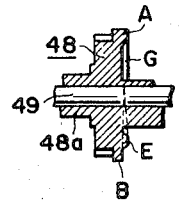

In FIG. 9, two gears 46 and 47 are fixed on a driving shaft 45 and are driven by a motor 44. Gear 47 is meshed with the teeth of claw operation cam 48 for turning this cam 48 in one direction. Claw operation cam 48 is provided at its center with a shaft opening 48a, as shown in FIGS. 11(a) and (b), in which a sliding shaft 49 is slidably fitted. Sliding shaft 49 is provided on its tip with an engage end 49a engaged with fade-in and fade-out operation cam 39 of control cam member 36, on its central portion with a notched engage portion 49b, and on its tail portion (on the left end in FIG. 8) with a pin 49c projected to the side as shown in FIG. 8 and FIG. 9. The tail portion thereof is fitted in a bushing 53 supported on the camera body and pin 49c projects into a slot 53a provided parallel to the axial direction of bushing 53. Pin 49c also fits in a spiral slot 54a of sleeve 54 in which bushing 53 is fitted.

A spring 55 is provided rearwardly of the tail portion of sliding shaft 49 for urging engage end 49a forwardly into contact with fade-in and fade-out operation cam 39. A fixed shutter blade 56 is disposed on bushing 53 and a shutter blade 57 is disposed on sleeve 54.

As shown in FIG. 12 an eccentric cam 52 is provided on cam 48 eccentrically about sliding shaft 49 for turning claw operation plate 58 along its shaft 58a and driving it up thereby down and moving feed claw 58b up and down. A cam extending in the cam shaft direction has two cam surfaces 50 and 51 concentric with respect to one another relative to sliding shaft 49, these surfaces being formed concentrically in the same plane and differing in phase by 180° from each other. Portion A of cam surface 50 and portion E of cam surface 51 project outwardly, and portion B of cam surface 50 and portion G of cam surface 51 are depressed (see FIGS. 11(a) and (b) ). In FIG. 12, contact piece 42c of change-over lever 42, arranged for sliding into contact with any surface of cam surfaces 50 and 51, effects a turning of claw operation plate 58 about its shaft 58a as it contacts the high and low portions of the cam surface. Feed claw 58b is therefore moved back and forth relative to perforations of the film (not shown in the drawings).

Figure 10:
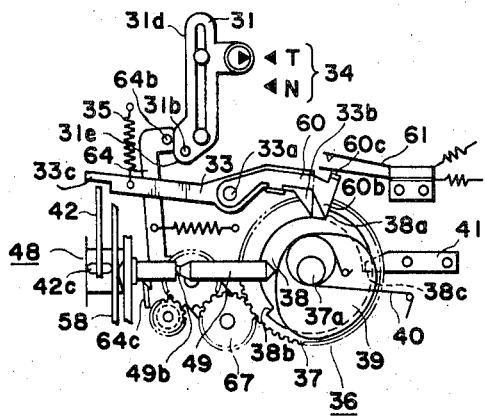
FIG. 10 is a side view showing the condition at the time when the film rewinding is completed during overlap photographing, in said embodiment.

A switch lever 60 is pivotally supported on shaft 33a of operation lever 33, and is provided with a projection 60a in engagement with bent-up portion 33d of operation lever 33d of operation lever 33, as shown in FIGS. 8 and 10. An engage projection 60b is provided on lever 60 for engagement with cam 38, and an upwardly projecting switch operation projection 60c thereon faces a stop switch 61 which is mounted normally open. Cam 38 of control cam member 36 constitutes a two-stepped cam by means of its stepped portions 38a and 38b which engage with projection 60b of switch lever 60. Cam 38 is also provided with a stepped portion 38c for engaging with engage projection 33of operation lever 33.

As shown in FIG. 8, motor 44 forms a circuit with electric power source 62 through a release switch 63 and stop switch 61 so that motor 44 is driven when switches 61 and 63 are closed.

Operation plate 31 is formed as having a vertical edge, and a sloping edge 31e at its lower portion. Pin 64b on clutch lever 64 engages with side edges 31d and 31e, and clutch lever 64 is mounted for pitoval movement about a shaft 64a on the camera body and is given a clockwise turning tendency means of a spring 65. And, clutch lever 64 is provided with a bent-up restraining piece 64c. A gear 66 is rotatably mounted on shaft 64a and gear 67 is rotatably mounted on a shaft 67a and meshes with gear 66. Both shafts 64a and 67a are mounted on clutch lever 64. When pin 64b on clutch lever 64 comes into contact with vertical edge 31d of operation plate and when clutch lever 64 is turned clockwise, gear 67 moves out of meshing engagement with gear 37, as shown in FIG. 8, and bent-up restraining piece 64c engages with notched engage portion 49b of sliding shaft 49 to restrain sliding shaft 49. When pin 64b comes into contact with edge 31e, and clutch lever 64 is turned counter-clockwise as shown in FIG. 9, gear 67 meshes with gear 37 and bent-up restraining piece 64c disengages from notched engage portion 49b to release the restraint of sliding shaft 49. Gear 66 remains in meshing engagement with gear 46 via intermediate gear 68.

Reference numerals from 70 to 73 shown in the right upper portion in FIG. 8 and FIG. 9 designate a film feed counter device, counter plate 71 being provided with ratchet 71a so as to be turned by feed lever 70 interlocked with the driving mechanism of the camera. However, in the case of overlap photographing, in order to prevent the counter from overlapping between the fade-out and fade-in photographing at the time of rewinding, feed lever 7 is engaged with release lever 69 mounted for engagement with and disengagement from feed lever 7 in interlocking relationship with the driving mechanism of the camera. When operation plate 31 is moved so that its index 316 points to overlap photograph T, as shown in FIG. 9, operation plate 31 engages with release lever 69 to turn release lever 69 clockwise, and claw 70a of feed lever 70 is disengaged from teeth 71a of counter plate 71 to stop the counting operation thereof. A pawl 73 is provided for preventing counter plate 71 from reversing.

In the arrangement described above, during normal photographing shown in FIG. 8, operation plate 31 is moved downwardly so that its index 31c points to index N, and operation pin 31b thereby pushes against operation lever 33 to move it counter-clockwise about shaft 33a. Contact piece 42c of changeover lever 42 contacts cam surface 50 along the outer circumference of the cam, and through operations of cam surface 50 and eccentric cam 52, when claw operation plate 58 descends, feed claw 58b engages with a perforation of the film so that the film is clawed downwardly. And, when claw operation plate 58 is raised feed claw 58b is out of contact with the film perforations.

On the other hand, pin 64b provided on clutch lever 64 engages with vertical edge 31d of operation plate 31 and clutch lever 64 rotates clockwise about shaft 64a by means of spring 65, so that gear 67 is no longer meshed with gear 37 of control cam member 36. Control cam member 36 is rotated counter-clockwise by means of spring 40 until pin 37b provided on gear 37 contacts stopper 41.

In such a position of control cam member 36, engage end 49a of sliding shaft 49 is in contact with the large diameter portion where fade-out and fade-in operation cam 39 is most projected (see FIG. 8). Therefore, sliding shaft 49 is pushed to move to the left (see FIG. 8) against spring 55, and in this position shutter blade 57 puts places fully upon fixed shutter blade 56. Also restraining piece 64c of clutch lever 64 engages with notched engage portion 49b of sliding shaft 49 to be restrained thereby maintaining sliding shaft 49 immovable. Moreover, switch lever 60 is pushed upwardly by cam 38 by means of projection 60c to thereby close stop switch 61.

And, release lever 69 is disengaged from operation plate 31, and counter devices 70, 71, and 72 are in an operative condition.

Therefore, when release switch 63 is closed in the condition shown in FIG. 8, motor 44 is actuated and, with the rotation of driving shaft 45, feed claw 58b operates to feed the film from the supply side to the take-up side by means of cam surface 50 and eccentric cam 52, and the normal photographing is effected by shutter blades 56 and 57 in the full opening condition. In interlocking with said film feeding operation, counter devices 70, 71, and 72 count the length of the film photographed.

When carrying out the overlap photographing from the normal photographing operation, plate 31 is moved upwardly to place pointer 31c of operation plate 31 in line with index T. For this purpose, release lever 69 engages with operation plate 31 and places the counter device in an inoperative condition. Simultaneously with this ascending of operation plate 31, operation pin 31b also ascends. However, engage projection 33b of operation lever 33 is in contact with cam 38 so that operation lever 33 is prevented from the turning clockwise by means of spring 35, and stop switch 61 is held in a closing condition by means of switch lever 60.

On the other hand, edge 31e of operation plate 31 pushes pin 64b, provided on clutch lever 64 as shown in FIG. 9, and clutch lever 64 is turned counter-clockwise against spring 65 about shaft 64a. Therefore gear 67 meshes with gear 37 and bent-up restraining piece 64 is disengaged from notched engage portion 49b of sliding shaft 49 to thereby allow the sliding of sliding shaft 49. Operation lever 33 cannot be turned and it is just as in the condition shown in FIG. 8. Therefore operation edge 33c thereof is by no means displaced to press against change-over lever 42, and change-over lever 42 is in its clockwise turning position, shown by the full line in FIG. 12, against spring 43. As a result, contact piece 42c thereof rests against cam surface 50 along the outer circumference of the cam.

Therefore, driving shaft 45, in rotation follows on cam surface 50 via gear 47, and claw operation plate 58 still transfers the film to the film take-up side. On the one hand, gear 37 of control cam member 36 is rotated clockwise by gear 46 through gears 68, 66, and 67, and fade-out and fade-in operation cam 39 to turn in the same direction with gear 37 so as to reduce the radial length of the cam at engage end 49a of sliding shaft 49. Therefore, moved shaft 49 is gradually slided to the right by means of spring 55, and pin 49c moves in slots 53a and 54a to the right so as to turn sleeve 54 by reason of spiral slot 54a. As shutter blade 57 turns with sleeve 54, the aperture of both shutter blades 56 and 57 is gradually decreased and, consequently, the fade-out photographing is effected. When control cam member 36 is turned about 90°, the shutter aperture is fully screened and, simultaneously, engage projection 33b of operation lever 33 falls in step portion 38c of cam 38, as shown in FIG. 9. Thus, operation lever 33 is rotated clockwise about shaft 33a and, with the ascending of operation edge 33c, change-over lever 42 is rotated clockwise by means of spring 43, and contact piece 42c thereof is moved from cam surface 50 along the outer circumference to cam surface 51 along the inner circumference. At this juncture, engage projection 60b of switch lever 60 is still on the large diameter portion of cam 38 and stop switch 61 is closed. As a result, cam surface 51, rotated driving shaft 45 to continue the turning, operates claw operation plate 58 in the film rewinding direction by means of contact piece 42c in opposition to cam surface 50. As long as the film is fed to the film rewinding direction, engage end 49 of sliding shaft 49 is in contact with the small diameter portion 49a of fade-in and fade-out operation cam 39, so that shutter blades 56 and 57 maintain them in a full closing condition. When control cam member 36 is turned further about 90° and the film rewinding is completed, engage projection 60b of switch lever 60 falls in step portion 38a of cam 38 and, as a result, stop switch 61 is opened and motor 44 is automatically stopped as shown in FIG. 10.

Thereafter, upon pushing down operation plate 31 to locate-index 31c thereof in line with index N, operation plate 31 is disengaged from release lever 69, counter devices 70, 71, and 72 are again rotated to the operative condition. And, operation lever 33 is rotated counter-clockwise by operation pin 31b, and operation edge 33e rotates change-over lever 42 clockwise against spring 43 (the position shown by the full line in FIG. 12). And, contact piece 42c of change-over lever 42 is transferred again from cam surface 41 along the inner circumference to cam surface 50 along the outer circumference, and claw operation plate 58 is set to feed the film from the supply side to the take-up side, and simultaneously switch lever 60 closes stop switch 61. Meanwhile, even though pin 64b of clutch lever 64 is disengaged from edge 31e of operation plate 31, notched engage portion 49b of sliding shaft 49, which has moved to the right cannot engage with bent-up restraining piece 64c, and bent-up restraining piece 34c is in engagement with the large diameter side of sliding shaft 49 (shown in FIG. 10). Therefore, the counter-clockwise rotation of clutch lever 64 is maintained and gear 67 of clutch lever 64 continues to mesh with gear 37.

Therefore, when release switch 63 is closed, driving shaft 45 driven by motor 44 again rotates control cam member 36 further clockwise via gears 46, 48, 66, 67, and 37, and the diameter of cam 39 in contact with engage end 49a of sliding shaft 49 is gradually increased, so that the aperture of shutter blades 56 and 57 is accordingly enlarged. On the one hand, claw operation plate 58 feeds the film to the take-up side by means of cam surface 50 along the outer circumference so that the fade-in photographing is effected on the film rewound. Thus, when notched engage portion 49b of sliding shaft 49 which has moved to the left, engages with bent-up restraining piece 64c of clutch lever 64, clutch lever 64 is rotated clockwise by spring 65. Therefore, gear 67 is out of meshing engagement with gear 37 and control cam member 36 is rotated counter-clockwise by means of spring 40, and pin 37b thereof engages with stopper 41 to stop, and returns to the condition shown in FIG. 8 so as to enable the subsequent normal photographing to be effected.

What is claimed is:

1. A motion picture camera comprising:
   a driving member mounted for rotation in one direction;
   a pivotable claw operation plate having a film feed claw, said claw being movable in a first direction parallel to the film plane and a second direction perpendicular to the film plane;
   a claw operation means rotated by said driving member, said claw operation plate having an eccentric cam engaged with said claw operation plate for moving said claw in said first direction, and a face cam having two cam surfaces, the rise of said two cam surfaces having a phase difference of substantially 180°;
   a contact member disposed between said face cam and said claw operation plate, said contact member selectively contacting one of said two cam surfaces for moving said claw in said second direction;
   a change-over member for selectively moving said contact member into contact with one of said two cam surfaces, the selection of one of said two cam surfaces resulting in the selection of one of two phase relationships between the movements of said claw in said first and second directions, the difference between said two phase relationships producing forward or reverse film feed, respectively;
   an operation member normally biased in a first position for normal photography and movable to a second position for overlap photography;

a control cam member operatively connected with said driving member when said operation member is in said second position;

a variable shutter having two shutter blades mounted on a shaft, said two blades being angularly movable by said control cam member to vary the exposure aperture of said variable shutter;

a means controlled by said operation member and said control cam member for operating said change-over member to produce reverse film feed;

a film footage counter;

a film feed lever interlocked with said driving member and engageable with said film counter; and a means for releasing the engagement of said feed lever with said counter when the film is fed in a reverse direction.

2. The motion picture camera according to claim 1 wherein:

said two cam surfaces are disposed concentrically with respect to said driving member, one of said cam surfaces being located at the outer periphery of said face cam, and the other of said cam surfaces being located inwardly of said one cam surface;

said contact member comprising a contact piece;

said change-over member comprising a change-over lever for selectively moving said contact piece into contact with one of said two cam surfaces; and when said operation member is in said second position for overlap photography, and said control cam member fully closes the exposure aperture of said variable shutter, said control cam member actuates said change-over lever to change over the contact engagement of said contact piece from said one of said cam surfaces to said other of said cam surfaces, to thereby produce reverse film feed by said film feed lever.

3. The motion picture camera according to claim 2 further comprising:

clutch means including a gear for interlocking with said driving member, said clutch means further including a clutch lever which is engaged with said operation member, said clutch lever having a clutch gear thereon, and said clutch lever being mounted for engagement and disengagement of said clutch gear with a fixing gear provided on said control cam member, and an operation lever pivotable about a shaft for engagement with said control cam member for changing over the contact engagement of said contact piece from said one of said cam surfaces to said other of said contact surfaces.

4. The motion picture camera according to claim 2, further comprising:

a control member slidably disposed relative to said shutter shaft for controlling said exposure aperture of said variable shutter, said control member comprising a sliding shaft located within said shutter shaft and being movable toward and away from said contact cam member; and said control cam member including an operation cam plate in contacting engagement with one end of said sliding shaft to effect the sliding movement of said sliding shaft for varying said exposure aperture of said variable shutter.

5. The motion picture camera according to claim 3, further comprising:

a switch lever pivotally mounted on said operation lever shaft for opening and closing a prime motor circuit of said driving member;

said exposure aperture of said variable shutter being varied by turning of said shutter blades relative to one another about said shutter shaft;

a control member for controlling said exposure aperture;

said control cam member including a cam, both said operation lever and said switch lever being in contacting engagement with said cam, and said control cam member further including an operation cam plate in contacting engagement with said control member; and a spring in operation engagement with said control cam member for returning said control cam member when said clutch gear is disengaged from said fixing gear.

* * * * *

UNITED STATES PATENT OFFICE
CERTIFICATE OF CORRECTION

Patent No. 3,820,883         Dated June 28, 1974

Inventor(s) Isamu Kubota and Yukio Miki

It is certified that error appears in the above-identified patent and that said Letters Patent are hereby corrected as shown below:

In the title page please insert: --Claims priority based on Japanese applications Nos. 81259/70 and 90267/70, filed September 18, 1970 and October 13, 1970, respectively--

Signed and sealed this 12th day of November 1974.

(SEAL)
Attest:

McCOY M. GIBSON JR.
Attesting Officer

C. MARSHALL DANN
Commissioner of Patents